Sept. 26, 1967  R. P. CAHN ETAL  3,343,916
CYCLIC GAS SEPARATION PROCESS AND SYSTEM
Filed Feb. 19, 1965
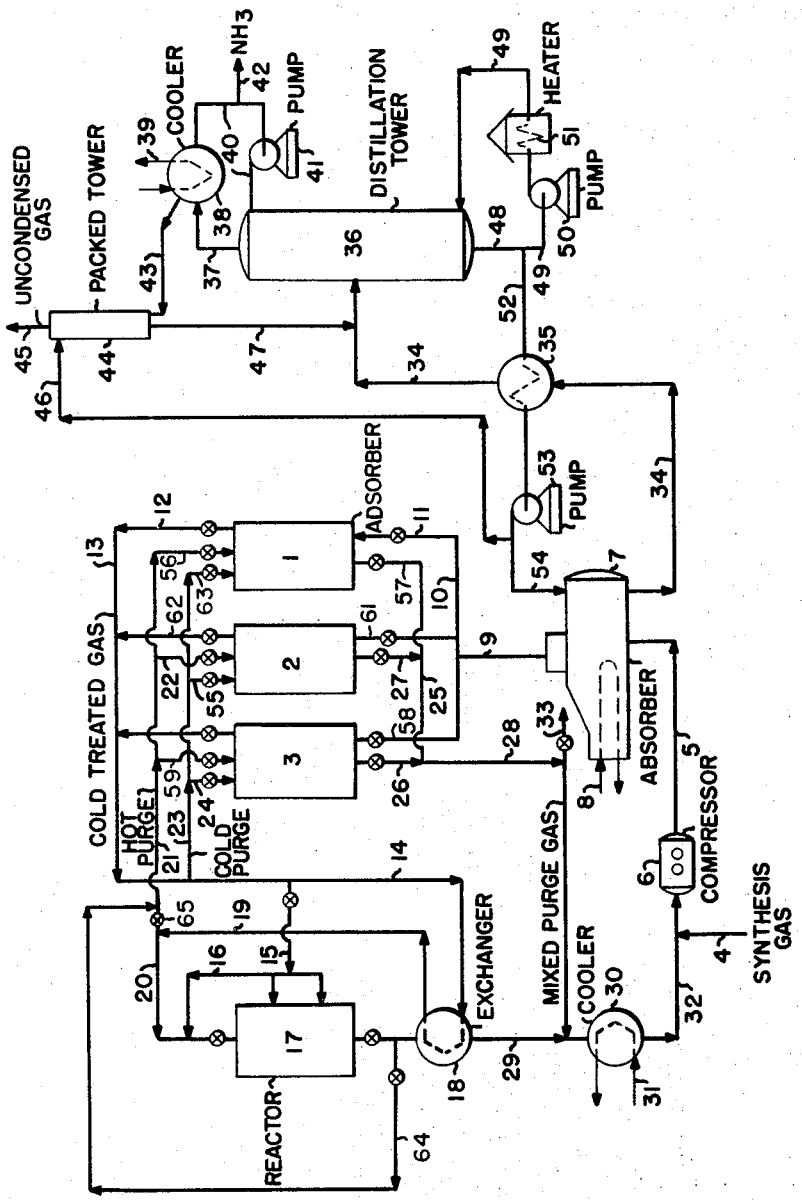
Robert P. Cahn
Patrick P. McCall   Inventors
By   *Henry Beck*
Patent Attorney

United States Patent Office 3,343,916
Patented Sept. 26, 1967

3,343,916
CYCLIC GAS SEPARATION PROCESS
AND SYSTEM
Robert P. Cahn, Millburn, and Patrick P. McCall, Madison Township, Middlesex County, N.J., assignors to Esso Research and Engineering Company, a corporation of Delaware
Filed Feb. 19, 1965, Ser. No. 434,071
2 Claims. (Cl. 23—199)

This invention relates to a cyclic process for separating by water absorption gaseous components that are more water-soluble from gas components that are less water-soluble in a cyclic system in which a portion of the system has to be maintained essentially free of water at all times. It relates particularly to a cyclic process under elevated pressure, comprising gas-phase reaction, water absorption of the water-soluble reaction product and certain other components, and recycling to the reactor of unreacted, unabsorbed gases via an adsorptive drying bed which removes water, and means to regenerate the adsorber with portions of gas streams readily available in the process.

A significant object of the invention is to provide a cyclic process and system in which the synthesis gas stream flows under nearly the same pressure through the absorber, the adsorber, and reactor, i.e., the pressures are similar except for pressure drops in passing through these units in series. In general, therefore, the circulated gas stream is maintained under a pressure above 50 atmospheres in passing through the units and in being recirculated.

The novel cyclic process and system of the present invention is particularly well adapted for use in ammonia synthesis to purify the $N_2$ and $H_2$ synthesis gases, to recover the $NH_3$ product, and to purify a recirculated $N_2$ and $H_2$ gas stream. Also it is adapted for separating adsorbable and absorbable components from gas streams that are to be enriched in a desired component such as either $N_2$, $H_2$, as well as mixtures thereof.

The ammonia synthesis procedure of interest uses pressures in the range of 50 to 400 atmospheres and reaction temperatures in the range of about 750° to 1025° F. (400° to 550° C.) for the reaction of 3 parts by volume of $H_2$ with one part by volume of $N_2$ in a synthesis gas contacted with a catalyst, such as $K_2O$ promoted iron or other known catalysts.

A preferred method of removing $NH_3$ from unreacted $H_2$ and $N_2$ is by water absorption, especially when operating in the lower pressure range of 50 to 400 atmospheres. However, water is a bad catalyst poison and must be carefully excluded from the reaction system. The unreacted synthesis gas should have contaminants and diluents such as $H_2O$, $CO_2$, CO, and $CH_4$ removed if this synthesis gas is recirculated. Also, the $N_2$ and $H_2$ make-up gas has to be treated to remove such contaminants and diluents.

Although many systems using adsorbents have been devised for purifying or drying gases of various kinds, none have been adapted for efficient use in combination with other continuous process steps that require the gases to be maintained under a relatively high pressure, controlled continuous flow and composition, particularly with respect to adsorbable components, for effective purification, hot purging of adsorbate from adsorbent with a portion of the dried gas, cool purging with another portion of the dried gas while keeping the synthesis reaction and the absorption recovery in balance as to conditions and flow rates.

The known systems of adsorption for drying or purifying gases present difficulties of fluctuations in gas flow rates, compositions, pressures, and temperatures, particularly when beds of adsorbent used are changing in their rates of adsorption and are shifted from an adsorption to a regeneration stage; particularly when wide variations in pressure, temperature, flow and gas compositions could result in undesirable performance of the other process steps.

The system and procedure of the present invention which uses a continuous high pressure liquid absorption cooperatively in combination with an adsorption treatment of gas partially purified, flowing from the absorption zone under similar high pressure and purging with such gas in hot and cold purge steps, considerably lessens the mentioned undesired fluctuations.

In the cooperative combination of a high pressure liquid absorption with a cyclic adsorption treatment, a stream of gas having low solubility in the liquid absorbent and low adsorbability, e.g., $N_2$, $H_2$, or synthesis gas, with admixed components that are more absorbable and adsorbable, e.g., CO, $CO_2$, $H_2O$, $NH_3$, $CH_4$, $H_2S$, etc., is processed as follows:

(1) The gas mixture under elevated pressure is treated by liquid absorption to effect substantial removal of absorbable components;

(2) The thus partially purified gas that leaves the absorption zone under high pressure and appropriate temperature for adsorption is treated by solid adsorbent which adsorbs remaining small amounts of the adsorbable components, such as $H_2O$, $CO_2$, down to tolerated traces (total oxygen content of gas stream should not exceed 20 to 25 p.p.m. by volume in a typical $NH_3$ synthesis reactor feed gas mixture) so as to produce the desired purified gas product, most of which then is recovered or passed as a continuous stream to where it is to be used;

(3) A portion of the purified gas product from the adsorption zone is used as purge gas, hot then cold, in desorbing adsorbed components from spent adsorbent for regeneration of the adsorbent which takes place concurrently in the cyclic system with the adsorption purification;

(4) Used purge gas and desorbed components are returned to the liquid absorption zone, into which they are introduced, cooled and compressed with added raw gas to be purified, also with product gas containing unreacted $N_2$ and $H_2$ to be recirculated to the reaction zone from which the product gas is obtained.

Starting with the high pressure of the gas entering the absorption zone, only relatively small pressure drops need occur in the absorption and adsorption units so that the purified gas has high pressure for use, as in a synthesis reactor, and the recirculated product gas does not require much recompression.

The absorption treatment operates satisfactorily with water or aqueous absorbing liquid at high pressure employing well-known absorption principles of providing sufficient gas-liquid contact interface as in countercurrent gas to liquid flow, bubble towers, packed towers, multiple contact zones, or the like, continuous removal of the absorbing liquid containing the absorbed gas components and at a sufficiently low temperature so that the partially purified gas stream leaving the absorption zone carries with it a low amount of the absorbing liquid and absorbable components and is in suitable physical condition for the subsequent adsorption treatment.

In the adsorption treatment, the gas stream entering from the absorption unit has sufficiently lowered concentration of adsorbable components, a pressure and temperature favoring the selective adsorption of the adsorbable components without causing the adsorbent to become spent too rapidly in any part or any period.

When the used adsorbent has become spent, i.e., approaches the condition that permits breakthrough of adsorbables, e.g., $H_2O$, being removed, it is switched to the hot gas purge, because a branched stream of the purified gas under pressure can be heated to the desired hot purge temperature by heat exchange and used for purging the spent adsorbent of most of its adsorbate at temperatures that do not adversely affect the adsorbent. Only a minor portion of the purified gas needs to be used as hot purge gas, e.g., $\frac{1}{5}$ to $\frac{1}{10}$ or less, and it is even possible to use a similar small proportion of the synthesis reaction product as hot purge gas.

The hot purged adsorbent is cooled and further purged preferably with a still smaller portion of the purified gas under pressure, e.g., a branched stream of the dried gas leaving the adsorption zone and amounting to a fraction of the hot purge gas used in terms of flow rate, in the range of 10 to 50 volume percent of the hot purge.

From practical considerations, the adsorbent that is most useful for drying the synthesis gas ($3H_2+N_2+$impurities) has to be one that maintains adequate capacity for the $H_2O$ impurity in the presence of $NH_3$ through many cycles in which the adsorbent is subjected to the temperature variations of adsorption, hot purging and cold purging. An adsorbent found to be superior for this purpose is a synthetic faujasite molecular sieve which contains alkali metal oxide, alumina, and silica combined in a ratio represented approximately by $$Na_2O:Al_2O_3:nSiO_2$$

wherein $n$ is 3 to 6. These molecules are interconnected into a crystalline three-dimensional framework having a large number of pores with similar molecular dimensions, e.g., preferably in the range of 8 to 14 A. These molecular sieves, preferably in the form of spherical particles 1 to 5 mm. in size (4 to 12 mesh) are used to make up a bed occupying an adsorption vessel or chamber.

Although other kinds of zeolite adsorbents or molecular sieves may be used, the preferred zeolites are those having Y-type crystals, which are more resistant to deactivation. It is also possible to use other adsorbents such as alumina or silica gel and these may be made part of the bed, preferably the part first contacted by stream of synthesis gas treated for removal of moisture.

The use of two separate adsorber vessels, one on adsorption and the other on regeneration by hot and cold purging consecutively permits continuity in operation, but better results are obtained with at least three separate vessels, one being on adsorption, a second on hot purging, and a third on cold purging simultaneously and by having three vessels holding each bed interconnected with inlets and outlets for shifting each vessel into the next stage of its cycle.

A continuous hot purge gas-stream is obtained advantageously by dividing a stream from the dried synthesis gas leaving the bed in its adsorption stage after heating this stream by indirect heat exchange with effluent hot gas products from the synthesis reactor. A continuous cold purge gas stream is obtained by withdrawing before said heating step another portion of the dried synthesis gas leaving the bed on its adsorption stage. The remainder of the dried synthesis gas flows continuously to the synthesis reactor.

In experimentally controlling the flow and conditions of the adsorbent beds during each stage, the gas streams entering and leaving the beds can be analyzed for their contents of $H_2O$, $NH_3$, and other components to determine whether all factors are adjusted properly.

A significant factor in maintaining the stages in a satisfactory steady state is the $NH_3$ content of the wet synthesis gas entering the bed during its adsorption stage, because with increase of $NH_3$ in the wet gas, the capacity of the adsorbent for removing $H_2O$ becomes lowered. To avoid excessive fluctuations in the capacity of the adsorbent to remove $H_2O$ and to make the adsorption stage of suitable duration, the wet synthesis gas is given a sufficient $NH_3$ removal treatment, e.g., by having an adequate number of absorption stages in which water removes the $NH_3$ down to a determined low amount, e.g., less than 0.2%. Thus, likewise, in the purging and particularly the cold purging, the purge gas should have an $NH_3$ content as low as possible so that the adsorbent is not preloaded with $NH_3$ when the adsorbent is then used for $H_2O$ adsorption from wet synthesis gas.

In the cyclic operation, when the wet synthesis gas stream flows into the cooled regenerated bed, the adsorbable components are first adsorbed in the portion of the bed near the inlet of the wet gas, and in time the successive portions of the bed become loaded by the adsorbed components making a spent zone front that moves toward the gas outlet. When complete loading through the length of the bed is approached, passage of the wet gas through the bed is stopped and a hot purge stream of dry synthesis gas is passed through the bed, preferably in the opposite direction from the flow of the wet gas. The hot purge stream begins to heat up the bed, first near the inlet of the hot gas and drives off adsorbed gas components, so that the heated and regenerated zone spreads toward the hot purge gas outlet. In the third stage, the cold purge gas is passed through the bed, preferably in the same direction as the flow of the hot purge gas making a cold zone spread toward the cold purge gas outlet. As the cold purge flows through the bed it absorbs heat and makes a cooled regeneration zone that spreads toward the gas outlet. Thus, the cold purge stream absorbs heat and can desorb some adsorbed components that tend to remain near the gas outlet even when the hot purge desorption is incomplete. On starting the new cycle, the wet gas flowing in opposite direction may pick up some heat on entering and some residual adsorbed components, but in flowing toward the other end of the bed which is colder and free of adsorbed components, the gas undergoes adequate cooling and treatment. Thus, a steady operation is obtained with this adiabatic type of alternate heating and cooling considering the fact that the adsorbent solids are poor heat conductors. It is significant, however, that the dry purge gases and the wet gas to be treated must have well-controlled compositions to maintain steady operation in an automatic fashion. For example, if the cold purge reloads periodically the adsorbent with some adsorbed components, e.g., $NH_3$, so as to lower the capacity of the adsorbent to remove other components, e.g., $H_2O$, the treatment becomes erratic.

The use of a liquid solution absorption unit for treating the fresh synthesis gas, recycled gas, and purge gases that leave the adsorbent beds in conjunction with the adsorption unit has not only the function of removing and recovering $NH_3$ from the recirculated synthesis gas, but also the function of making gas streams fed to the adsorbent bed have a controlled temperature and composition, e.g., a low content of $NH_3$ and other components, such as CO, $CO_2$, A, and $CH_4$, which are more readily adsorbed than $N_2$ or $H_2$. Very effective control of temperature and overhead gas composition is obtained with the absorption unit under controlled elevated pressures to remove $NH_3$ and some of the other gas components undesired in the $N_2$ and $H_2$. By withdrawing a small bleed stream ranging from 2 to 10% of the make-up (fresh) synthesis gas from the gas circuit, the compositions can be further controlled.

In the cyclic adsorption-desorption operation, the gas to be treated flows under elevated pressure through a bed of the adsorbent at a suitable adsorption temperature, e.g., 60° to 100° F. (15° to 95° C.) for removal of water vapor from the gas. When the adsorbent is spent by holding its capacity of water, the bed is heated to a higher temperature suitable for desorption by passing heated, dry synthesis gas through the bed, so that the bed temperature is increased, e.g., up to 500° to 700° F. in the step which is called the hot purge step. Then in a third step relatively cold dry synthesis gas is passed through the bed as cold purge gas to complete desorption of water from the adsorbent and lower the temperature of the adsorbent to the adsorption temperature level, down within the range of 60° to 200° F., thus completing the cycle.

During the purging, and preferably the hot purging, the pressure in the adsorber vessel can be lowered as the purged gas is vented instead of being recirculated.

In using the cold purge gas under a pressure as high as the pressure of the wet synthesis gas passed through the bed in the subsequent adsorption step, no repressuring is required.

To recapitulate, in the procedure outlined for using adsorbent beds in a cyclic gas separation process, a bed of solid adsorbent in a first step is used to adsorb impurities to be removed from a gas stream, in a second step by purging at higher temperatures with a heated portion of purified gas to remove said adsorbed impurities, and in a third step is cooled with a portion of the purified gas, and the following features of improvement may be used:

(a) A synthetic faujasite adsorbent of long life in treating a gas containing $H_2$, $N_2$, $NH_3$ and $H_2O$, under elevated pressure;

(b) A liquid aqueous solution absorption unit for removing components more adsorbable than $N_2$ or $H_2$ under elevated temperatures for controlling the composition and temperature of the gas that is to be subjected to adsorption treatment;

(c) Simultaneous or consecutive use of a portion of the dried or purified gas as a hot gas purge stream and a portion as a cold gas purge stream in the regeneration step adiabatically with minimized pressure variations.

The features described act in coordination to make the process more efficient. The way in which they are implemented will be explained in more detail with reference to the accompanying drawing and examples.

The drawing is a schematic flow diagram of an ammonia synthesis plant having an adsorption unit and absorption unit for treating synthesis gas, treating recirculated gas, and recovering the $NH_3$ product.

In the drawing three vessels, 1, 2, and 3, hold the solid adsorbent beds indicated to be in a first adsorption step, second hot purge step, and third cold purge step, respectively, by the gas flow arrows and valves symbolized by crossed circles in the connecting lines.

Starting with the fresh synthesis gas supply line 4, the gas, cold and even impure, may be fed into line 5 on the suction side of compressor 6 to be passed under pressure into absorber 7 for intimate contact with liquid absorbent water or solution to remove components more soluble than $N_2$ and $H_2$, such as $NH_3$ for example, at sufficiently low temperatures, e.g., 60° to 150° F., the temperature being maintained by cooling coil 8. An absorption tower of adequate stages in which liquid passes countercurrently to gas may also be used. The absorber 7 may be a tower stack, or train of vessels.

The cooled and absorption-treated gas under elevated pressure, above 50 atms., contains a small amount of $H_2O$ vapor of saturation, or equilibrium vapor pressure, e.g., 500 to 2000 p.p.m. and may contain traces of other components not absorbed, e.g., CO, $CO_2$, A, $CH_4$, etc., when passed from absorber 7 through line 9 to header 10, then by a manifold line with its valve open into an adsorber vessel e.g., line 11 into vessel 1. The cold fresh or regenerated adsorbent adsorbs such components as $H_2O$ vapor, $CO_2$, CO, and $CH_4$ to varying degrees depending on the adsorbent, temperature, and pressure to purify the gas. Lowered temperature and increased pressure favor adsorption of the more adsorbable components. Any $NH_3$ present tends to be adsorbed, but not as strongly as $H_2O$ under the adsorption conditions, i.e., adsorption temperatures being in the range of about 60° to 150° F. and the pressures in the range of 50 to 400 atms. A slight amount of heat is evolved in adsorption. The cold purified $N_2$ and $H_2$ gas passes from the adsorber by line 12 with its valve open to header 13, then to where the gas is to be used.

A two-vessel adsorber unit can be used but more difficult control is required for maintaining continuous operation. For example, using vessel 1 for adsorption treatment of the stream entering from line 11, vessel 2 can be used for two stages of regeneration, the hot purge gas first being passed down through the bed in vessel 2 from open line 22 for a period that is part of the period that vessel 1 is on stream, then cold purified purge gas from line 55 being passed down through the bed in vessel 2 for a remaining period while vessel 1 is on stream for adsorption.

In the $NH_3$ synthesis plant, the cold treated synthesis gas from the header 13 is passed through line 14 from which a stream can be diverted through line 15 for injection at desired points through manifold lines connected to header 16 as a cold quench gas in regulating the temperature of the reaction mixture passing through said reactor. The main stream of the cold-treated synthesis gas may be heated by indirect heat exchange in the exchanger 18, then let passed through line 19 to enter as the synthesis feed by line 20 into the reactor 17.

Part of the preheated synthesis gas flowing through line 19 can be diverted to manifold header 21 to be used as hot purge gas, e.g., by being passed through line 22 with its valve open into the top of the vessel, to be passed downwardly through the spent solid adsorbent for regeneration of the adsorbent by removal of adsorbed gases at an elevated temperature.

A part of the cold treated gas flowing through line 14 is diverted into the header 23 to be passed through line 24 with its valve opened to the top of vessel 3 to act as cold purge gas for cooling and finishing purging of an adsorbent in vessel 3 so it can go into the next stage for adsorption. With the manifolds connection of the headers shown, 10, 21, and 23, the vessels 1, 2, and 3 can be connected to be used for adsorption, hot purging and cold purging, each in its turn.

The collection header 25 is provided for receiving purged gases that pass through the vessels undergoing regeneration. The purged gas contains gas which effects purging and the desorbed gas components. Cold purged gas effluent leaves through line 26 with its valve opened from vessel 3 and hot purged gas effluent leaves vessel 2 through line 27 with its valve opened to the collection header or manifold 25. The mixed purged gases containing the substances removed from the adsorbents are passed through line 28 to line 29 to be mixed therein with the product gas which has been withdrawn from reactor 17 through heat exchanger 18 as it is passed next to the cooler 30. The cooler 30 may be kept low in temperature by indirect heat exchange with cold water circulated through line 31.

The cooled gas mixture of reaction product and purged gas in passed through line 32 to the compressor 6; thus completing the cycle for synthesis gas which has not undergone reaction.

In the absorber 7 operated as described for treatment of the synthesis gas from line 5, water soluble and absorbable components are removed by the liquid absorbent.

For removing such gases as may tend to build up and be insufficiently absorbed in the absorber, a bleed stream is removed and is vented through line 33. This bleed stream should be kept as low as possible to avoid loss of valuable $N_2$ and $H_2$. In the ammonia recovery system, which includes the absorption unit 7, the solution containing absorbed ammonia is passed by line 34 through heat exchanger 35 to the distillation tower 36. The distillation tower is operated under elevated pressure in the range of 5 to 300 p.s.i.g. and at a top temperature in the range of 60° to 150° F. (15° to 65° C.) to distill off the NH₃ or aqueous ammoniacal solution from the liquid solution. The distillation gases overhead from tower 36 are passed by line 37 to a condenser 38 in which the gases are cooled to the temperature at which the NH₃ is liquefied by means of indirect heat exchange fluid which is passed through coil 39.

A portion of the liquid ammonia is refluxed through line 40 and with the pump 41. Product, liquid NH₃, is to be withdrawn through line 42. Distillation gases which are not condensed in the condenser 38 are passed by line 43 to packed tower 44 for a second stage to recover NH₃ and to separate lower boiling fixed gases which are vented overhead through line 45. These uncondensed gases may include such compounds as CO, $CO_2$, $CH_4$, A, $N_2$ and $H_2$.

Lean solution, i.e., solution from which NH₃ had been distilled in tower 36, is passed by line 46 into the upper part of tower 44 to act as a scrubbing liquid. This scrubbing liquid with the NH₃ picked up by absorption in tower 44 is returned to the distillation tower by line 47.

The residual or lean solution resulting from distillation collects at the bottom of tower 36 is withdrawn through line 48. A portion of this bottom liquid may be recycled through line 49 by pump 50 through a heating coil 51 to supply heat for the distillation in tower 36. Other heat exchange arrangements may be made, or open steam may be used in this tower. A portion of the bottoms or lean solution withdrawn from tower 36 is passed by line 52 through the heat exchanger 35 to pump 53 to be returned in part to the absorption unit 7 by line 54 and in part to be passed up by line 46 in the upper part of packed tower 44.

In the cyclic operation of the three adsorption vessels, vessel 1 is on hot purge regeneration when valves in lines 11 and 12 are closed, the valve in its hot purge gas inlet line 56 is open and its purged gas outlet line 57 has its valve open. Vessel 3, having received its purging by cold treated gas, is then ready for treating partially purified gas from absorber 7, entering vessel 3 from line 58 with its valve open, cold purge gas inlet line 24 and hot purge gas line 59 being closed, purged gas outlet line being closed, and cold treated gas outlet line 60 being open. Vessel 2, having its purging by hot treated gas, is ready for receiving cold purge gas from line 55 with its valve opened, the valve in line 22 being closed, purged gas outlet line 27 being open. Vessel 2 after cold purging, has its purge gas inlet lines closed, its purged gas outlet line 27 closed, then is put onstream for treating gas led in by line 61 with its valve open to form a purified gas that exits through line 62 with its valve open. Vessel 1, after hot gas purging, has lines 56, 12, and 11 shut off, and is cold purged by gas passed in from line 63 with its valve open, line 57 leading away purged gas. Then vessel 1 is ready for starting treatment of gas to be purified while the other two vessels, 3 and 2, are set for cold purging and hot purging, respectively.

At any time during the cyclic operation of the system described, an adequate supply of hot purge gas may be obtained by diverting a desired portion of hot gas effluent product from reactor 17 through a valve controlled line 64 to the header 21. Although this effluent product contains NH₃ with unreacted N₂ and H₂, it is sufficiently low in water vapor to serve as a purge gas during the hot purge gas regeneration step. A pressure control valve 65 can be used in line 20 to divert to hot purge stream from the inlet to reactor 17.

It is possible to use a portion of the ammonia synthesis gas product after sufficient cooling as a cold purge gas insofar as i tis free of moisture and contains principally H₂ and N₂ with NH₃, but the preferred cold purge gas is obtained as a portion of the dried synthesis gas as described.

A cyclic treatment of recycle ammonia synthesis gas was successfully demonstrated in a pilot unit using two vessels with three stages for 59 cycles. The synthesis gas feed to the adsorber was made to contain close to 1100 p.p.m. $H_2O$ and 1100 p.p.m. NH₃. The adsorption conditions were controlled to dry the gas to a level of less than 2 p.p.m. using a synthetic faujasite adsorbent having a breakthrough capacity over twice the amount of $H_2O$ removed per cycle. The water content of the feed gas to the adsorber and of the dried product were continuously monitored with a hygrometer. Conditions and results of the tests are summarized as follows:

TABLE I.—PILOT UNIT ADSORPTION TREATING CONDITIONS
[Sieve—40 grams/bed of faujastie, 8–12 mesh spheres]

|  | Drying | Regeneration | |
|---|---|---|---|
|  |  | Hot Purge | Cold Purge |
| Gas | 3:1 $H_2/N_2$+ 1,100 p.p.m. $H_2O$, 1,100 p.p.m. NH₃ | Dry Product | Dry Product. |
| Flow | Upflow | Downflow | Downflow. |
| Cycle Stage Time, Min. | 120 | 60 | 60. |
| Flow Rate, s.c.f./hr | 28 | 4 | 1.25. |
| Pressure, p.s.i.g | 800 | 800 | 800. |
| Temperature: |  |  |  |
| °C | 54.4→43.3 | 43.3→343.3 | 343.3→54.4. |
| °F | 130→110 | 110→650 | 650→130. |

Data on breakthrough showed that, the breakthrough capacity of the adsorbent for $H_2O$ is lowered by the NH₃ occupying some sites of the adsorbent, but a steady-state is realized so that the dried effluent gas contains less than 2 p.p.m. and principally about 1 p.p.m. The saturation capacity for $H_2O$ of the adsorbent at 100° F. was determined to be close to 0.2 gram $H_2O$ per gram adsorbent. The breakthrough capacity of the adsorbent at 100° F. was 0.12 to 0.17 gram $H_2O$ per gram adsorbent. The working capacity (difference between adsorbate held before and after regeneration) of the adsorbent under the operating conditions was in the range of 0.034 to 0.065 gram $H_2O$ per gram of adsorbent per cycle.

In using a satisfactory adsorbent such as a faujasite molecular sieve which resists deterioration in many cycles of adsorption, hot purging and cold purging of the gas components involved according to the present invention, the weight of gas used for heating in the hot purging is approximately 0.5 pound per pound of adsorbent per cycle, the weight of the cold gas used for cooling the adsorbent is a similar amount per pound of adsorbent per cycle. The additional amount of hot gas used for accomplishing the desorbing is approximately 50 volumes (at desorption temperature and pressure) per volume, of adsorbent bed. These figures are based on the conclusions that the adsorbent is allowed to reach a maximum working capacity of 0.04 pound of $H_2O$ per pound of adsorbent per cycle.

The invention described is claimed as follows:

1. A process for separating and purifying a supply stream of $H_2$ and $N_2$ in a recycled stream from an ammonia synthesis reaction zone and a raw gas stream to remove NH₃, $H_2O$ and carbon oxides as components more soluble in water, which comprises the steps:
   (a) removing said components more soluble in water from the supply stream at an elevated pressure above 50 atms. by absorption into an aqueous absorbing liquid in an absorption zone to make said supply stream of gas have a lowered amount of the components more soluble in water;
   (b) passing said supply stream of gas lowered in amount of the components more soluble in water from the absorption zone into contact with solid adsorbent which removes all but a small trace amount of adsorbable components more soluble in water as well as water itself, while said supply stream of gas passes through an adsorption zone containing said adsorbent at said elevated pressure;

(c) heating a portion of the supply stream of gas freed of water in the adsorption zone and passing the resulting hot dried gas as hot purge gas into a regeneration zone for contact at said elevated pressure with solid adsorbent that has adsorbed the components more soluble in water as well as water itself to desorb said components as the adsorbent is heated;

(d) passing through said regeneration zone a portion of the supply stream of gas freed of adsorbable components in the adsorption zone as a cold dry purge gas further to remove adsorbed components from and cool the adsorbent being regenerated at said elevated pressure;

(e) passing purge gas mixed with desorbed components from the regeneration zone to the absorption zone;

(f) passing a main portion of the supply stream of gas purified in the absorption and adsorption zones to the ammonia synthesis reaction zone;

(g) adding raw synthesis gas requiring purification under compression to said elevated pressure to gas passing from said reaction zone to the absorption zone.

2. Apparatus for recovering and purifying ammonia synthesis gases which comprises:

(a) a reactor having an inlet for synthesis feed gas and an outlet for gas product;

(b) an absorber connected by a line to the outlet of the reactor to receive the gas product;

(c) means for cooling said gas product passed from the reactor to the absorber;

(d) means for compressing said gas product passed through said means for cooling and means for adding raw synthesis to said compressing means;

(e) means for passing absorbing liquid through the absorber;

(f) adsorber vessels connected by valved lines to receive cyclically a stream of partially purified gas from the absorber;

(g) valved pipe connections for passing a portion of gas passed through the adsorber on stream for adsorption back to another of the adsorbers on regeneration;

(h) means for heating a portion of the gas passed back to an adsorber on regeneration;

(i) means for withdrawing gases from the adsorber vessel on regeneration; and (j) valved connection for forwarding a stream of the unadsorbed gas from the adsorber to the inlet of the reactor.

References Cited
UNITED STATES PATENTS

| | | | |
|---|---|---|---|
| 1,849,357 | 3/1932 | Pyzel | 23—199 |
| 2,785,045 | 3/1957 | Wan et al. | 23—3 |
| 2,992,703 | 7/1961 | Vasan et al. | 55—70 |
| 3,126,266 | 3/1964 | Meisler | 62—18 |

REUBEN FRIEDMAN, *Primary Examiner.*

SAMIH N. ZAHARNA, *Examiner.*

C. N. HART, *Assistant Examiner.*